(12) United States Patent
Gonzalez et al.

(10) Patent No.: US 7,904,533 B1
(45) Date of Patent: *Mar. 8, 2011

(54) INTEGRATED NETWORK AND CUSTOMER DATABASE

(75) Inventors: Jose Gonzalez, Maitland, FL (US); David Ham, Ashburn, VA (US); Shane Lobo, Orlando, FL (US); Steve Parrott, Clifton, VA (US); Jonathan Rubin, Arlington, VA (US); Drew Shinholster, Maitland, FL (US); Todd Szymanski, Winter Park, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/551,704

(22) Filed: Oct. 21, 2006

(51) Int. Cl.
*G06F 15/177* (2006.01)

(52) U.S. Cl. ......... 709/220; 709/224; 370/229; 370/328; 370/389

(58) Field of Classification Search .................. 709/220, 709/224; 370/229, 328, 389, 392
See application file for complete search history.

(56) References Cited

U.S. PATENT DOCUMENTS

| | | | |
|---|---|---|---|
| 5,898,826 A | 4/1999 | Pierce et al. | |
| 6,046,988 A | 4/2000 | Schenkel et al. | |
| 6,570,867 B1 | 5/2003 | Robinson et al. | |
| 6,700,967 B2 | 3/2004 | Kleinoder et al. | |
| 6,792,273 B1 | 9/2004 | Tellinger et al. | |
| 6,813,634 B1 * | 11/2004 | Ahmed | 709/224 |
| 6,973,042 B1 | 12/2005 | Fitzgerald | |
| 6,978,223 B2 | 12/2005 | Milliken | |
| 7,099,305 B1 | 8/2006 | Fardid | |
| 7,099,912 B2 * | 8/2006 | Ishizaki et al. | 709/201 |
| 7,110,362 B2 | 9/2006 | Kato | |
| 7,143,152 B1 | 11/2006 | Elman | |
| 7,376,719 B1 | 5/2008 | Shafer et al. | |
| 7,376,864 B1 * | 5/2008 | Hu et al. | 714/8 |
| 7,424,526 B1 | 9/2008 | Hansen et al. | |
| 7,467,225 B2 | 12/2008 | Anerousis et al. | |
| 7,751,392 B1 | 7/2010 | Gonzalez et al. | |
| 7,830,816 B1 | 11/2010 | Gonzalez et al. | |
| 7,831,709 B1 | 11/2010 | Ham et al. | |
| 2002/0022985 A1 | 2/2002 | Guidice et al. | |
| 2002/0078232 A1 * | 6/2002 | Simpson et al. | 709/238 |
| 2002/0087393 A1 | 7/2002 | Philonenko | |
| 2002/0103921 A1 * | 8/2002 | Nair et al. | 709/232 |
| 2002/0164007 A1 | 11/2002 | Henits | |
| 2002/0181047 A1 | 12/2002 | Lauder et al. | |
| 2003/0055972 A1 * | 3/2003 | Fuller et al. | 709/226 |
| 2003/0145072 A1 | 7/2003 | Lau et al. | |
| 2004/0006618 A1 | 1/2004 | Kasai et al. | |

(Continued)

OTHER PUBLICATIONS

Gonzalez, Jose, et al., "Customer Link Diversity Monitoring", U.S. Appl. No. 11/620,140, filed Jan. 5, 2007.

(Continued)

*Primary Examiner* — Wing F Chan
*Assistant Examiner* — Hitesh Patel

(57) ABSTRACT

A system having an integrated network and customer database is provided. The system retrieves router configurations to create the integrated database, which includes port data for each port on each router in each network. The system may determine the impact of proposed actions on routers. The system may process network events to display the status, port data, and customer data for each port. The system may respond to user input by polling a router and displaying the real time status, port data, and customer data for each port on the router.

21 Claims, 6 Drawing Sheets

U.S. PATENT DOCUMENTS

| | | | |
|---|---|---|---|
| 2004/0059781 A1 | 3/2004 | Yoakum et al. | |
| 2004/0064581 A1* | 4/2004 | Shitama et al. | 709/238 |
| 2004/0071164 A1* | 4/2004 | Baum | 370/469 |
| 2004/0210621 A1 | 10/2004 | Antonellis | |
| 2005/0091482 A1 | 4/2005 | Gray et al. | |
| 2005/0094653 A1 | 5/2005 | Milburn et al. | |
| 2005/0240835 A1* | 10/2005 | Dragnea et al. | 714/47 |
| 2006/0146694 A1 | 7/2006 | Hamaguchi et al. | |
| 2006/0215577 A1 | 9/2006 | Guichard et al. | |
| 2006/0268740 A1* | 11/2006 | Rosenberg et al. | 370/254 |
| 2007/0041554 A1* | 2/2007 | Newman et al. | 379/218.01 |
| 2007/0050497 A1 | 3/2007 | Haley et al. | |
| 2007/0250625 A1 | 10/2007 | Titus | |
| 2007/0274285 A1* | 11/2007 | Werber et al. | 370/351 |
| 2009/0201911 A1 | 8/2009 | DuPertuis et al. | |

OTHER PUBLICATIONS

Hame, David M., et al., "Flexible Grouping for Port Analysis", U.S. Appl. No. 12/036,289, filed Feb. 24, 2008.

Gonzalez, Jose, et al., "Network Access and Quality of Service Troubleshooting", U.S. Appl. No. 11/838,175, filed Aug. 13, 2007.

Office Action dated Jun. 15, 2009, U.S. Appl. No. 11/620,140, filed Jan. 5, 2007, 16 pages.

Office Action dated Apr. 3, 2009, U.S. Appl. No. 11/838,175, filed Aug. 13, 2007, 14 pages.

Final Office Action dated Nov. 27, 2009, U.S. Appl. No. 11/620,140, filed Jan. 5, 2007, 17 pages.

Final Office Action dated Nov. 24, 2009, U.S. Appl. No. 11/838,175, filed Aug. 13, 2007, 14 pages.

Advisory Action dated Feb. 17, 2010, U.S. Appl. No. 11/620,140, filed Jan. 5, 2007, 3 pages.

Notice of Allowance dated Mar. 22, 2010, U.S. Appl. No. 11/620,140, filed Jan. 5, 2007, 10 pages.

Advisory Action dated Mar. 24, 2010, U.S. Appl. No. 11/838,175, filed Aug. 13, 2007, 3 pages.

Office Action—First Action Interview Pilot Program Pre-Interview Communication dated Apr. 2, 2010, U.S. Appl. No. 12/036,289, filed Feb. 24, 2008, 31 pages.

Notice of Allowance dated Aug. 2, 2010, U.S. Appl. No. 11/838,175, filed Aug. 13, 2007, 20 pages.

Notice of Allowance dated Jul. 26, 2010, U.S. Appl. No. 12/036,289, filed Feb. 13, 2008, 18 pages.

Gonzalez, Jose, et al., "Virtual Link Mapping", U.S. Appl. No. 11/746,273, filed May 9, 2007.

Office Action dated May 25, 2010, U.S. Appl. No. 11/746,273, filed May 9, 2007, 13 pages.

Final Office Action dated Nov. 19, 2010, U.S. Appl. No. 11/746,273 filed on May 9, 2007.

* cited by examiner

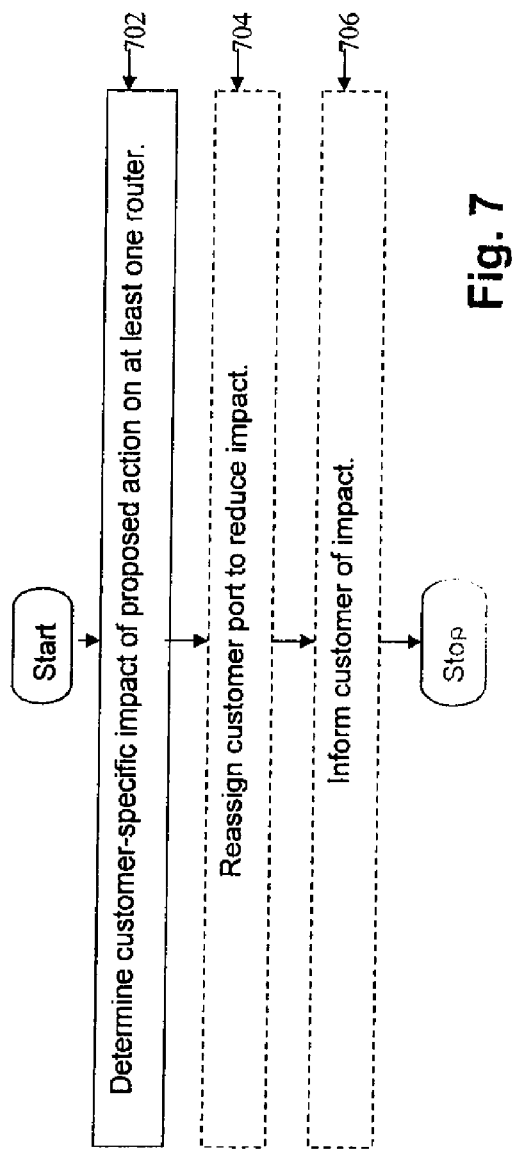
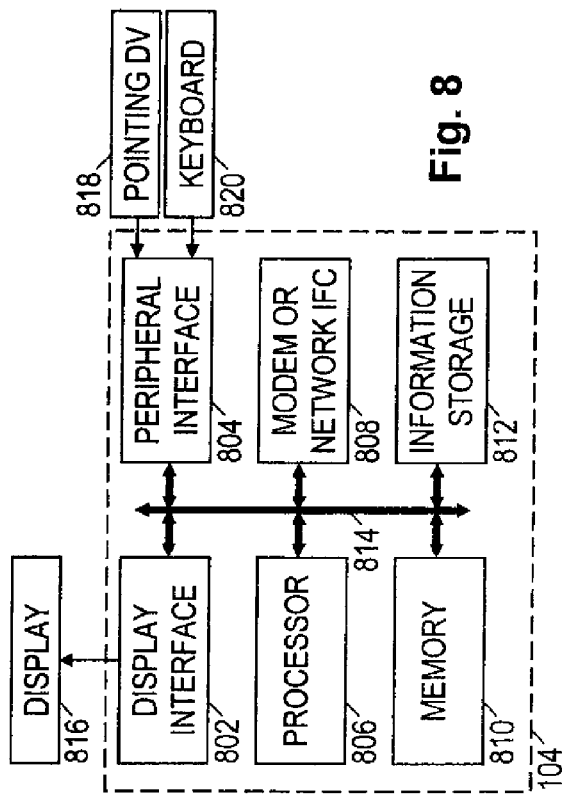

INTEGRATED NETWORK AND CUSTOMER DATABASE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An internet service provider may monitor the status of network devices through a network monitoring system that includes network data for network devices. The network monitoring system does not have customer data that would enable a technician to determine which customers may be impacted by work on a network device that provides service to customers or the degree of the impact for any of the customers. Additionally, a customer service representative accessing a network monitoring system and a customer service system may be unable to verify a customer claim that network service is currently unavailable for some of the customer's computers or that network service was completely unavailable for a number of days during a preceding week.

SUMMARY

In one embodiment, a computer implemented method for an integrated network and customer database is provided. Router configurations are parsed to create port data for each port on each router. The port data is integrated with customer data to create an integrated database. A customer-specific impact of a proposed action on at least one router is determined.

In another embodiment, a system having an integrated network and customer database is provided. The system includes a database manager and a data retriever. The database manager parses router configurations to create port data for each port on each router, and integrates the port data with customer data to create an integrated database. To supplement the port data with the customer data in the integrated database, the data retriever responds to user input by polling a router to display a port status with corresponding port data and customer data from the integrated database on a user interface.

In yet another embodiment, a method for an integrated network and customer database is provided. Router configurations are parsed to create port data for each port on each router. The port data is integrated with customer data to create an integrated database. A network event is processed to display a port status with corresponding port data and customer data from the integrated database on a user interface.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIG. 7 shows an illustrative maintenance method for an integrated network and customer database according to some embodiments of the present disclosure.

FIG. 8 shows a block diagram of an illustrative server for an integrated network and customer database.

DETAILED DESCRIPTION

It should be understood at the outset that although implementations of various embodiments of the present disclosure are described below, the present system may be implemented using any number of techniques, whether currently known or in existence. The present disclosure should in no way be limited to the implementations, drawings, and techniques described below, but may be modified within the scope of the appended claims along with their full scope of equivalents.

In some embodiments of the present disclosure, a system having an integrated network and customer database is provided. The system retrieves router configurations to create the integrated database. The system may use customer names included in the router configurations with customer names lists to integrate customer data with network data, which includes port data for each port on each router in each network. The system may determine the impact of proposed actions on routers. The system may process network events to display the status, port data, and customer data for each port. The system may respond to user input by polling a router and displaying the real time status, port data, and customer data for each port on the router.

Figure 1:
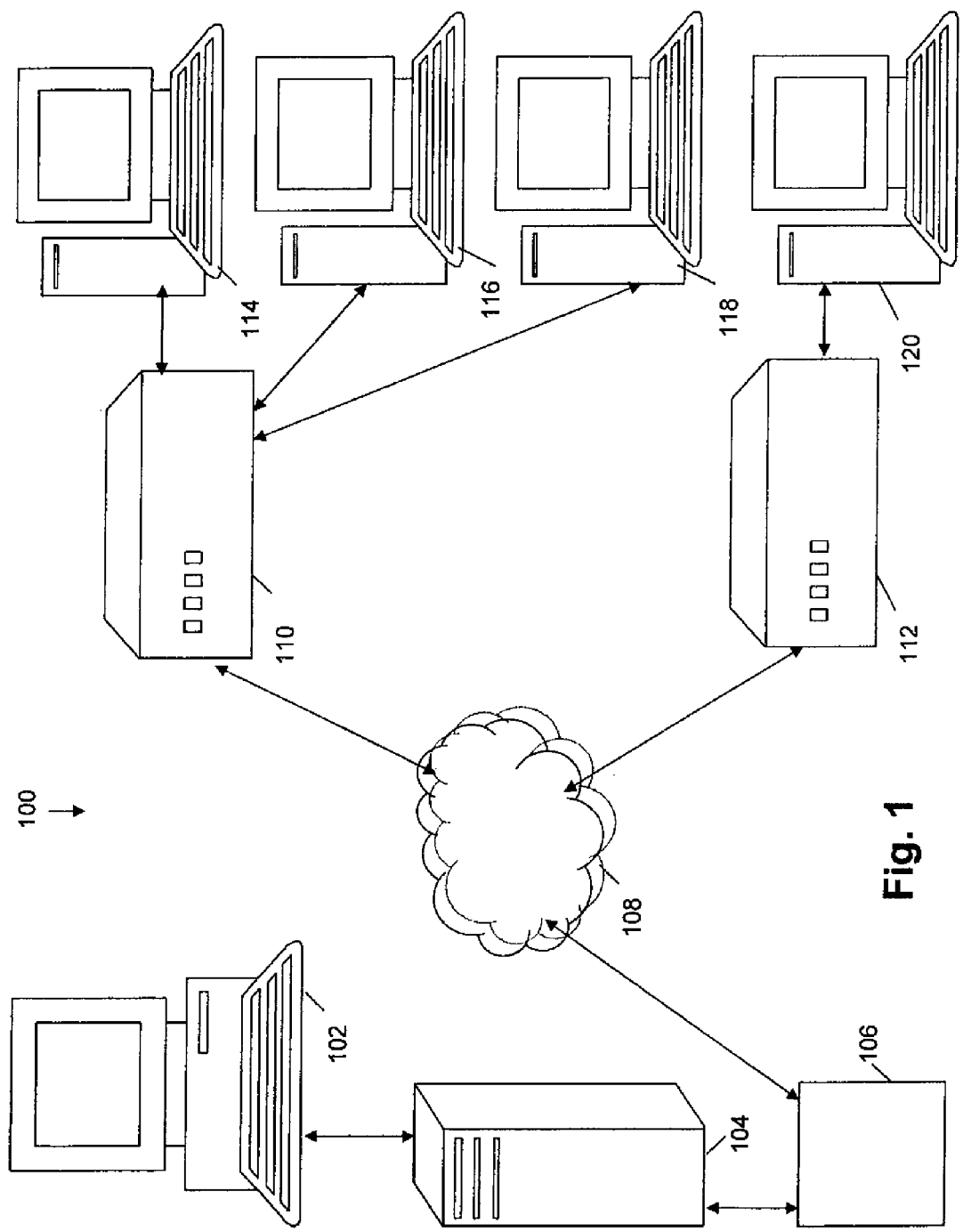
FIG. 1 shows an illustrative integrated network and customer database system according to some embodiments of the present disclosure.

Turning now to FIG. 1, an illustrative integrated network and customer database system 100 is depicted according to some embodiments of the present disclosure. The numbers of each type of component in the system 100 are depicted in FIG. 1 for the purpose of an illustrative example only, as the system 100 may include any number of each component type. The system 100 includes a user interface 102 and a database server 104. The user interface 102 enables a user to interface with an integrated network and customer database on the database server 104. The user may input customer data into the integrated network and customer database through the user interface 102 to the database server 104.

The database server 104 may store data retrieved by a data retriever 106 accessing a network 108. The data retriever 106 may retrieve network data from network devices, such as a first router 110 and a second router 112 that communicate with the network 108. One network may include thousands of routers 110-112 for routing messages between computers. The routers 110 and 112 are depicted as external to the network 108 for illustration purposes, as in FIG. 1, but may be components within the network 108. Each router may forward data packets across the network 108 toward their destinations. For example, the first router 110 sends and receives data packets for a first customer computer 114, a second customer computer 116, and a third customer computer 118, while the second router 112 sends and receives data packets for a fourth customer computer 120. The database server 104 may store the network data with customer data to create an integrated network and customer database.

Figure 2:
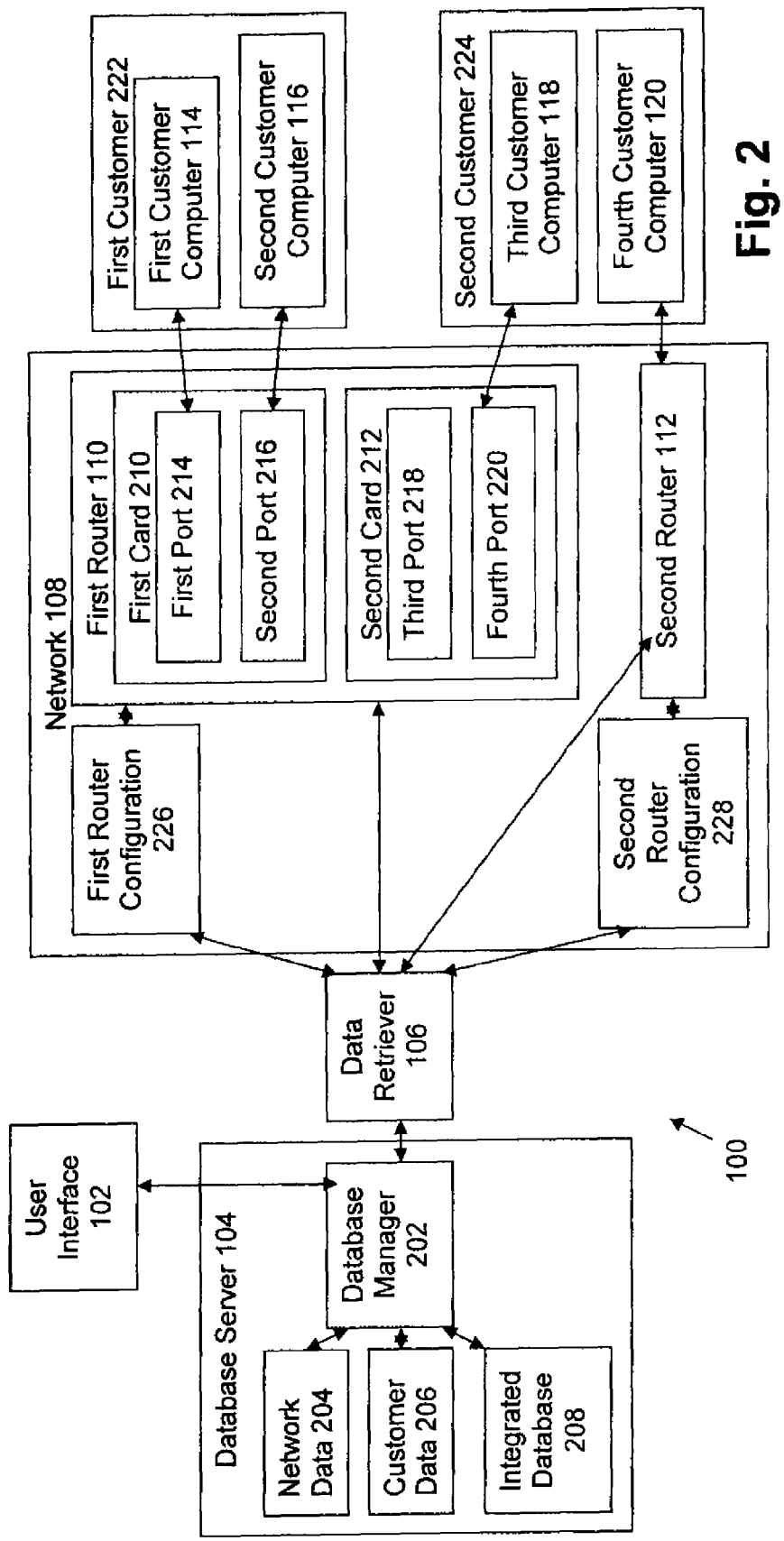
FIG. 2 shows a block diagram of an illustrative integrated network and customer database system according to some embodiments of the present disclosure.

Turning now to FIG. 2, a block diagram of the illustrative integrated network and customer database system 100 is depicted according to some embodiments of the present disclosure. The numbers of each type of each component in the system 100 are depicted in FIG. 2 for the purpose of an illustrative example only, as the system 100 may include any number of each component type. The database server 104 may include a database manager 202 that integrates network data 204 with customer data 206 to create an integrated database 208. The network data 204 may include the port data for individual ports. The database manager 202 may receive input from a user through the user interface 102 and display the network data 204 and the customer data 206 from the integrated database 208 on the user interface 102. The data retriever 106 may retrieve the network data 204 from the network 108 to send to the database manager 202 to store in the integrated database 208. Although depicted as retrieving the network data 204 from only one network, the network 108, the data retriever 106 may retrieve the network data 204 from any number of networks. Likewise, the database manager 202 may integrate the network data 204 from any number of networks with the customer data 206 to create the integrated database 208.

The network 108 may include the first router 110, which may include a first card 210 and a second card 212, and the second router 112. Each card may include multiple ports that each link with a customer computer. For example, the first card 210 may include a first port 214 and a second port 216 while the second card 212 may include a third port 218 and a fourth port 220. A first customer 222 may have multiple customer computers that link to the network 108 through the first router 110. The first customer 222 may have the first customer computer 114 linked to the first port 214 on the first card 210 on the first router 110 and the second customer computer 116 linked to the second port 216 on the first card 210 on the first router 110. Additionally, a second customer 224 may have the third customer computer 118 linked to the fourth port 220 on the second card 212 on the first router 110 and the fourth customer computer 120 linked to the second router 112.

The network 108 may store router configuration information off-line in a backup data store for each router to enable each router to reconfigure properly following the interruption of router power, such as power outages or router maintenance. The router configuration information that includes which customer computer is linked to which port on which card for the first router 110 may be stored in a file in non-volatile memory in a first router configuration 226. The first router configuration 226 may be an off-line backup data store on board the router. Similarly, the router configuration information that includes which customer computer is linked to which port on which card for the second router 112 may be stored in a file in non-volatile memory in a second router configuration 228. By accessing router configuration information in the first router configuration 226 and the second router configuration 228, the data retriever 106 does not directly access the first router 110 or the second router 112, thus eliminating the possibility of interfering with router operation by directly accessing the routers.

Figure 3:
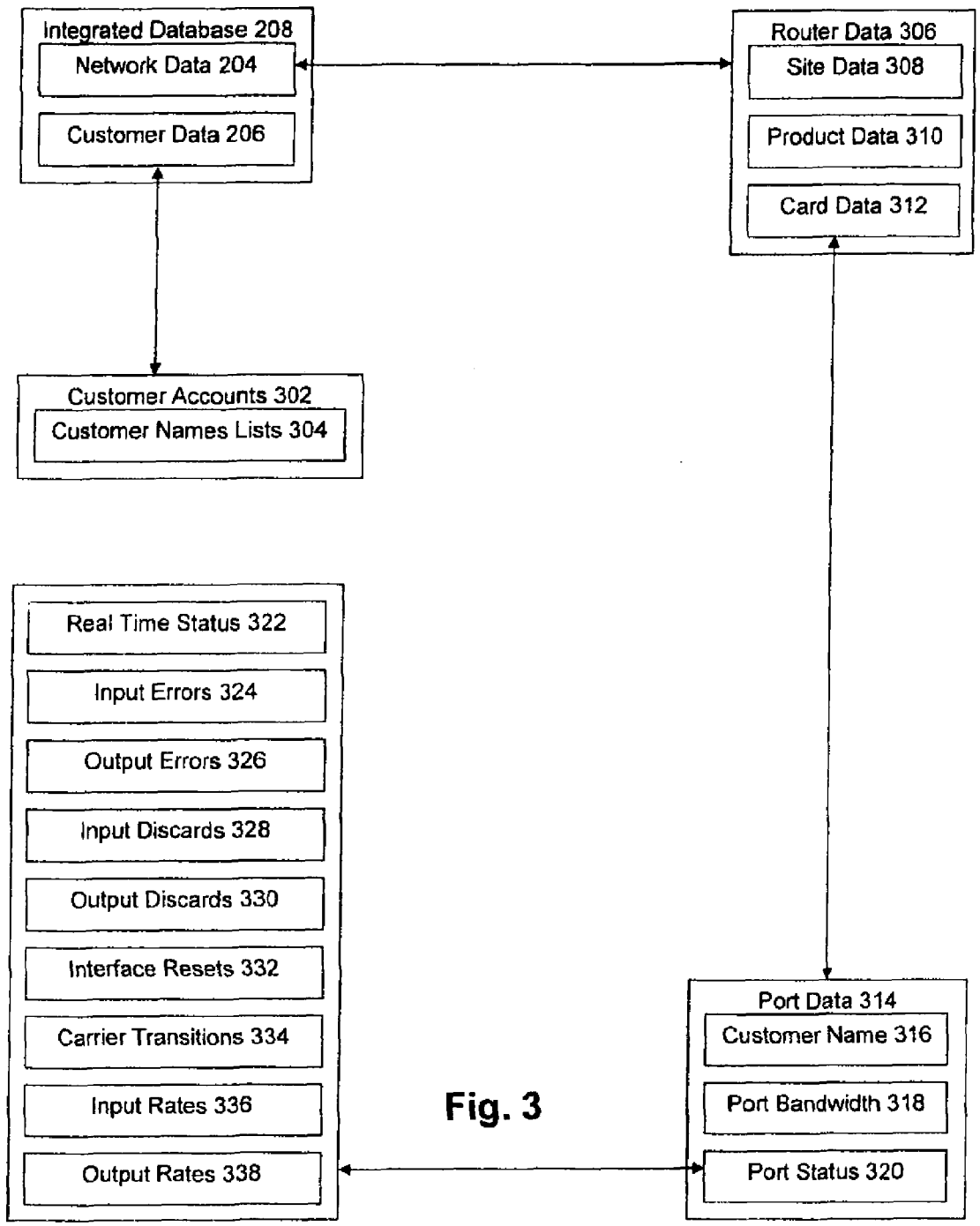
FIG. 3 shows a schema for an illustrative integrated network and customer database according to some embodiments of the present disclosure.

Turning now to FIG. 3, a schema for the illustrative integrated network and customer database 208 is depicted according to some embodiments of the present disclosure. The integrated database 208 may include the customer data 206 and the network data 204. The customer data 206 may be related to customer accounts 302, a customer database that may include business information, such as billing plans, billing information, and customer names lists 304.

Each of the customer names lists 304 may include a list of each customer name used by a specific customer. For example, "Acme Corp." and "Acme Homes" may be customer names used by the customer Acme Homes Corporation. In contrast, "Acme Elevators" may be a customer name used by a customer that is unrelated to Acme Homes Corporation. The integrated database 208 may use the customer names lists 304 to integrate the network data 204 to the corresponding customer in the customer data 206. For example, the network data 204 for "Acme Corp." and "Acme Homes" may be integrated with the customer data 206 for the customer Acme Homes Corporation, but the network data 204 for "Acme Elevator" may be integrated with the customer data 206 for a different customer. The integrated database 208 may present customer names from the customer names lists 304 to a user through the user interface 102 to enable the user to select which customer names in the customer names lists 304 correspond to which customers.

The network data 204 may be related to router data 306, which may include network information, such as site data 308, product data 310, and card data 312 for a specific router. The network data 204 may be related to multiple networks, with each network including any number of routers and data for each of the routers. The router data 306 may be router configuration data that is stored off-line in a data store as a recovery file to enable a router to recover after power outages or router maintenance. The data retriever 106 may retrieve the router data 306, which may be parsed by the database server 104 to create the site data 308, the product data 310, the card data 312, and other types of data for the integrated database 208.

The site data 308 may include a geographic location for a specific router, such as New York, Chicago, or Atlanta. The site data 308 may also include the street address for a customer linked to a specific router. By relating the site data 308 for each router to a customer, the integrated database 208 may display the router data 306 for each router related to the customer that is located at a site selected through the user interface 102. For example, if a user selects Atlanta as a site and Acme Homes Corporation as a customer, the integrated database 208 may display the router data 306 for each of Acme Home Corporation's routers that are located in Atlanta. Because a customer may communicate through multiple networks from the same site, the integrated database 208 may display the name of the corresponding network along with the router data 306 for each router.

The product data 310 may include identifying data for the hardware and the software for a specific router. For example, the product data 310 may identify a router as a SprintLink dedicated Internet protocol, a SprintLink frame relay router, a SprintLink packet private line, or a SprintLink local area network service. The product data 310 may also identify the software image version for a specific router.

The card data 312 may include data for specific ports located on a specific card. The data retriever 106 may retrieve the router data 306, which the database server 104 may parse to create the card data 312 and port data 314 related to the card data 312. Only one instance of the port data 314 is depicted for the purpose of an illustrative example only, as each card may include multiple ports and the card data 312 may be related to instances of the port data 314 for each port. The port data 314 may include a customer name 316, a port bandwidth 318, and a port status 320. The integrated database 208 may use the customer name 316 for a specific port with the customer names lists 304 to determine to which customer the specific port corresponds. By determining which specific ports correspond to which customers, the database server 104 may respond to a selection through the user interface 102 of a specific customer listed in the customer names list 304 by displaying the port data 314 for each port that corresponds to the specific customer. The database server 104 may also respond to the selection of the specific customer name by displaying the port bandwidth 318 for each port that corresponds to the specific customer.

The database server 104 may parse the router data 306 to create the port status 320 and data for the port status 320, such as real time status 322, input errors 324, output errors, 326, input discards 328, output discards 330, interface resets 332, carrier transitions 334, input rates 336, and output rates 338. The real time status 322 for a specific port indicates the condition of the specific port, and may be listed as "up," "down," "administratively shutdown," "up with errors," and "up without passing traffic," based on the other data for the port status 320.

If the operation for a specific port degrades, causing an outage for the port, the real time status 322 may be set to down. Outages for ports are grouped into specific conditions and weighed accordingly for availability calculations. If the real time status 322 for a specific port is not set to "up," or the specific port is set to "up without passing traffic," the outage weight is set to 100%. The input errors 324, the output errors 326, the input discards 328, and the output discards 330, which are described below, each have an outage weight set at 25% apiece.

An outage for a port is a network event that is recorded by the integrated database 208 to specify the beginning of a shutdown period for the port. The integrated database 208 also records whether the outage is planned, such as for maintenance, or unplanned, such as for power outages. The real time status 322 remains set to "down" until the condition that determined the real time status 322 changes, another network event recorded by the integrated database 208. The availability of a port for a specified time period may be based on the outage weights for each of the outage conditions and the amount of time that each of the outage conditions exists.

The real time status 322 may be set to "up," "down," "administratively shutdown," "up with errors," or "up without passing traffic" based on the data for the port status 320, such as the input errors 324, the output errors 326, the input discards 328, the output discards 330, the interface resets 332, the carrier transitions 334, the input rates 336, and the output rates 338. If any of the data for the port status 320 exceeds a corresponding threshold level, the real time status 322 may be changed, such as from "up with errors" to "down" when error rates increase. Conversely, if any of the data for the real time status 322 drops below a corresponding threshold level, the real time status 322 may be changed, such as from "up without passing traffic" to "up" when traffic passes. The real time status 322 may be changed to "administratively shutdown" when error conditions exist below a preset threshold level, but are determined to still be significant.

The input errors 324 include numbers for cyclical redundancy check errors, framing errors, and aborts. Numbers above one percent of the total interface traffic may indicate a link problem that requires isolation and repair. The input errors 324 may indicate a circuit, cable, connector, data service unit, or router hardware problem. The output errors 326 are the sum of all errors that prevent the final transmission of data-grams out of an interface.

The input discards 328 are an indication that the rates of input exceed the capacity of the router, which causes the queue to fill and the router to drop packets. Such a condition may indicate that too much traffic is on the interface or that the router cannot switch packets fast enough. The output discards 330 indicates that the traffic rate on the outgoing interface cannot accept all of the packets that are to be sent out. Such a condition may indicate that a customer is over-utilizing an interface. If the output queue is continually full and if no packets are sent out of the interface, a hardware failure on the interface may have occurred.

The interface resets 332 indicate missed keep-alive packets, which may be caused by congestion on links, a bad line causing change directory transitions, or by hardware problems at the channel service unit, the data service unit, or the switching equipment. The carrier transitions 334 indicate interruption in the carrier signal, such as an interface reset at the remote end of a link. The carrier transitions 334 may be caused by line interruptions due to an external source, such as physical separation of cabling, lightning, or by problems with switching, the data service unit, or router hardware.

The input rate 336 is a measure of the input over a time period, and may include a comparison to the bandwidth and the resulting utilization calculation. Repeatedly creating an input rate may indicate a decline in input over time, which may indicate an input problem. Similarly, the output rate 338 is a measure of the output over a time period, and may include a comparison to the bandwidth and the resulting utilization calculation. Repeatedly creating an output rate may indicate a decline in output over time, which may indicate an output problem.

Figure 4:
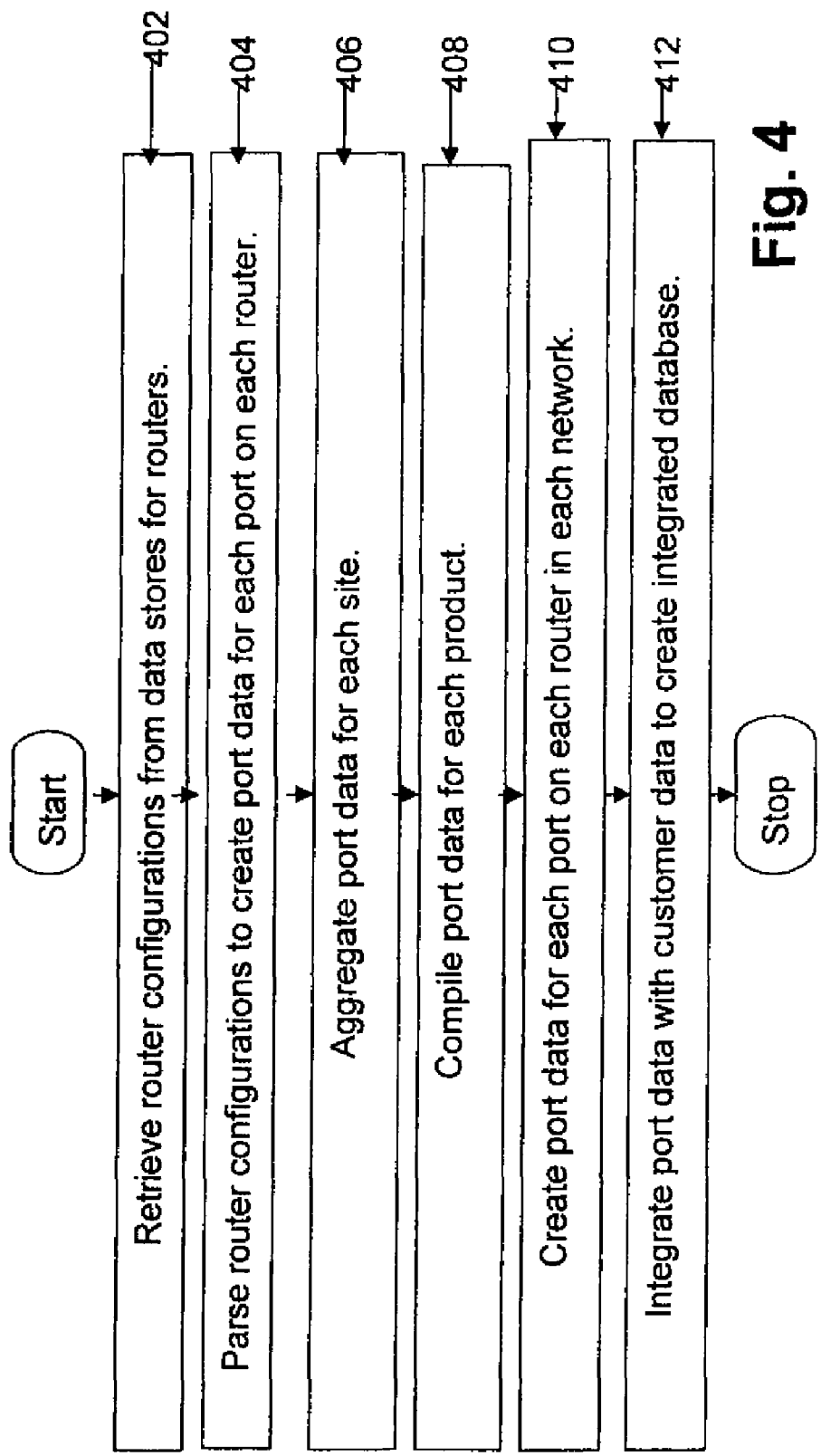
FIG. 4 shows an illustrative integration method for an integrated network and customer database according to some embodiments of the present disclosure.

Turning now to FIG. 4, an illustrative integration method for an integrated network and customer database is depicted according to some embodiments of the present disclosure. Executing the integration method results in integrating the network data 204 with the customer data 206 for each customer listed in the customer names lists 304.

In box 402, the data retriever 106 retrieves router configurations from data stores for routers. The data retriever 106 may retrieve the router configurations from off-line backup data stores for the routers so that the on-line routers are not directly accessed during normal operations. The on-line routers may store their router configurations in the off-line backup data stores periodically, such as each day when throughput is low.

In box 404, the database server 104 parses the router configurations to create the port data 314 for each port on each router. The data .retriever 106 may retrieve the router data 306 and the database server 104 may parse the router data 306 to create the port data 314 for each port on each router. Alternatively, the data retriever 106 may retrieve the router data 306 and parse the router data 306 to create the port data 314 for each port on each router. For example, parsing the router data 306 may create the port data 314 that specifies the customer name 316 for a port is "Acme Homes," the real time status 322 for the port is up, and that the port bandwidth 318 for the port is 56,000 bits per second. As another example, parsing the router data 306 may also create the site data 308 that specifies Chicago as the geographic location for the router that contains the port and create the product data 310 that indicates the router is a SprintLink frame relay router.

In box 406, the database server 104 aggregates the port data 314 for each site. For example, the database server 104 aggregates the port data 314 for each router in each geographical location, such as aggregating the port data 314 for each router located in Chicago, aggregating the port data 314 for each router located in New York, etc.

In box 408, the database server 104 compiles the port data 314 for each product. For example, database server 104 may compile the port data 314 for each router identified by the product data 310 as a SprintLink frame relay router.

In box 410, the database server 104 creates the port data 314 for each port on each router in each network. In case of multiple networks, the data retriever 106 executes boxes 402 to 408 for each network. This execution results in retrieving the router configurations from data stores for each router for each network, creating the port data 314 for each port on each router for each network, aggregating the port data 314 for each site for each network, and compiling the port data 314 for each product on each network. If the database server 104 is integrating a network and customer database for only one network, executing box 410 results in only continuing to box 412.

In box 412, the database server 104 integrates the port data 314 with the customer data 206 to create the integrated database 208. The database server 104 may use the customer name 316 for each port on each router in combination with the customer names list 304 to integrate the customer data 206 with the network data 204, which includes the port data 314. For example, the port data 314 related to the network data 204 may specify that the customer name 316 for the first port 214 is "Acme Homes," and the port data 314 related to the network data 204 may specify that the customer name 316 for the second port 216 is "Acme Corp." For this example, the database server 104 integrates the port data 314 for the first port 214 and the port data 314 for the second port 216 with the customer data 206 for Acme Homes Corporation. The database server 104 stores this integrated network data 204 and customer data 206 in the integrated database 208. The integrated database 208 may include network data 204 that is current data and network data 204 that is historical data.

For example of a result from the database server 104 creating the integrated database 208, a user may select a router through the user interface 102 to display all of the port data 314 that corresponds to the router. Displaying all of the port data 314 that corresponds to the router enables the user to evaluate potential problems for any port on the router in the wider context of the other ports on the router that includes the port. For an example of a result from creating the real time status 322 for each port, a user may select one type of real time status 322, such as "down," through the user interface 102 to display all of the port data 314 that corresponds to the ports with the real time status 322 of "down." Displaying all of the port data 314 that corresponds to the ports with the real time status 322 of "down" enables the user to evaluate any port with the real time status 322 of "down" in the wider context of the other ports on the network with the real time status 322 of "down."

For an example of a result from compiling the port data 314 for each site, a user may select a customer name through the user interface 102 to display all of the port data 314 that corresponds to each site for the customer. Displaying all of the port data 314 that corresponds to each site for the customer enables the user to evaluate potential problems with any site in the wider context of the other sites for the same customer. As another example, a user may select a site through the user interface 102 to display all of the port data 314 that corresponds to the site. Displaying all of the port data 314 that corresponds to the site enables the user to evaluate potential problems with any port in the wider context of the other ports at the same site. For an example of a result from compiling the port data 314 for each product, a user of may use the user interface 102 to select the SprintLink frame relay connection from the product data 314 to display all of the SprintLink frame relay connections and the port data 314 that corresponds to each SprintLink frame relay connection. Displaying all of the SprintLink frame relay connections and the port data 314 that corresponds to each SprintLink frame relay connection enables a user to evaluate potential problems with any port on a SprintLink frame relay network in the wider context of the other ports on a SprintLink frame relay network.

For an example of a result from compiling the port data 314 for each port on each router in each network, a user of may select a customer name through the user interface 102 to display all of the port data 314 that corresponds to each network for the customer. Displaying all of the port data 314 that corresponds to each network for the customer enables the user to evaluate potential problems with any network for the customer in the wider context of the other networks for the customer. As another example, a user may select a network through the user interface 102 to display all of the port data 314 that corresponds to the network. Displaying all of the port data 314 that corresponds to the network enables the user to evaluate potential problems with any port in the wider context of the other ports on the same network. As yet another example, a user may select a customer name through the user interface 102 to display all of the port data 314 that corresponds to the customer, which may include the number of ports linked to the customer and the bandwidth for the ports, for each network accessed by the customer. Displaying all of the port data 314 that corresponds to the customer enables a user to evaluate potential problems with any port for the customer in the wider context of the other ports for the customer.

Figure 5:
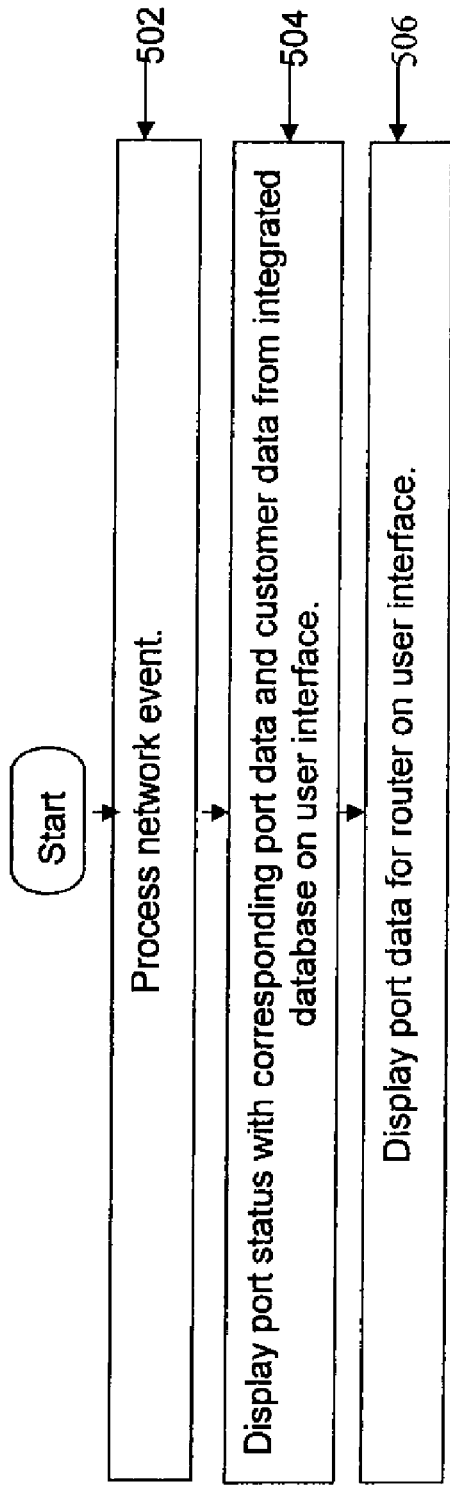
FIG. 5 shows an illustrative network event method for an integrated network and customer database according to some embodiments of the present disclosure.

Turning now to FIG. 5, an illustrative network event method for an integrated network and customer database is depicted according to some embodiments of the present disclosure. The network event method enables a user to monitor the real time status 322 for all ports on all routers in all networks.

In box 502, the database server 104 processes network events. For example, a network event occurs when the real time status 322 for an "Acme Homes" port changes from "up" to "down." The database server 104 processes such a network event to modify the network data 204 in the integrated database 208 to reflect the change in the real time status 322 for the "Acme Homes" port from "up" to "down."

In box 504, the database server 104 displays the real time status 322 with the corresponding port data and customer data from the integrated database 208 on the user interface 102. For example, the database server 104 displays the real time status 322 of "down" for the "Acme Homes" port with the corresponding port data 314 in the network data 204 and the customer data 206 for the port. Executing box 504 may enable a user to identify a potential action to take in response to the real time status 322 changing to "down" for the "Acme Homes" port. The database server 104 may also display analysis text that is associated with a currently displayed port status 320, such as the real time status 322 of "down," and suggest potential action for the user to take in response to the displayed port status 320.

In box 506, the database server 104 displays the port data 314 for a router on the user interface 102. For example, the database server 104 displays all of the port data 314 for the router that includes the port with the real time status 322 of "down" along with the network data 204 and the customer data 206 for the router. Executing box 506 may enable a user to evaluate the real time status 322 changing to "down" for the "Acme Homes" port in the wider context of the router that includes the port. This wider context may enable the user to differentiate between problems isolated to a card in a router and problems for the router.

Figure 6:
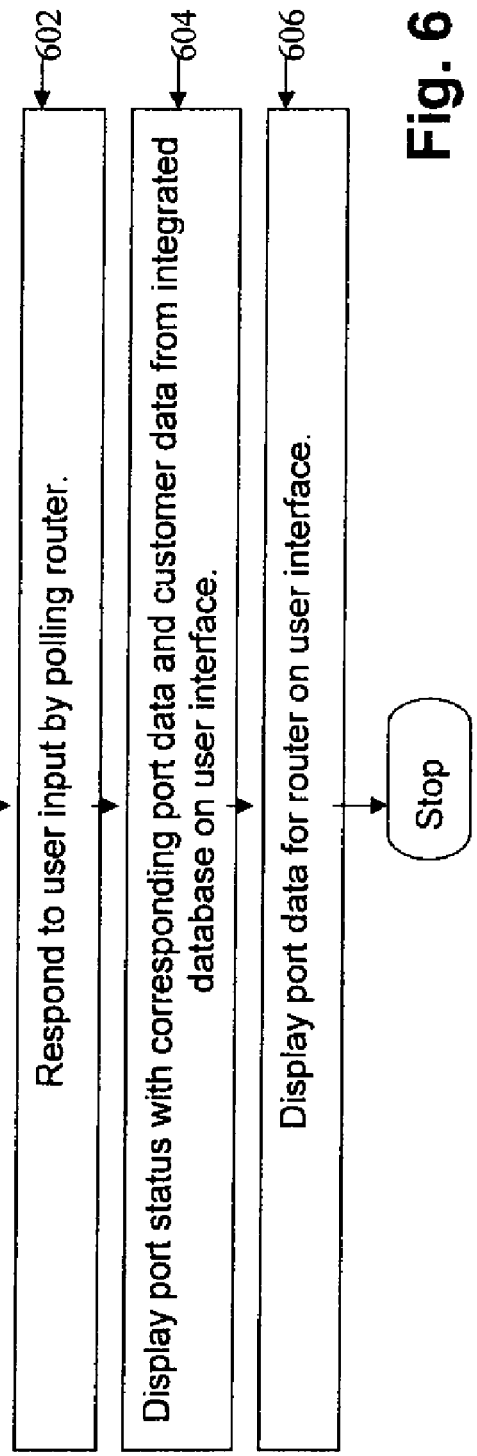
FIG. 6 shows an illustrative polling method for an integrated network and customer database according to some embodiments of the present disclosure.

Turning now to FIG. 6, an illustrative polling method for an integrated network and customer database is depicted according to some embodiments of the present disclosure. The polling method enables a user to monitor the real time port status 320 for a port.

In box 602, the data retriever 106 responds to user input by polling a router. For example, a user may select to poll a specific port on a router located in Atlanta in response to complaints from Acme Homes Corporation about problems with the specific port.

In box 604, the database server 104 displays the port status 320 with the corresponding port data and customer data from the integrated database on the user interface. For example, the database server 104 displays the port status 320, which may include the input rate 336 and the output rate 338, for the specific port with the corresponding port data 314 and the customer data 206 related to Acme Homes Corporation from the integrated database 208 on the user interface 102. Executing box 604 may enable a user to identify a potential action to take in response to a decreasing input rate 336 for the "Acme Homes" port. The database server 104 may also display analysis text that is associated with a currently displayed port status 320, such as the decreasing input rate 336, and suggest potential action for the user to take in response to the displayed port status 320.

In contrast to the network events method described above, which may result in waiting for the time period of a remote ping test to expire before a network event identifies a change in the port status 320, the polling method results in requesting the data retriever 106 to retrieve the real time data for the port status 320. In addition to displaying the input rate 336 and the output rate 338, measures of the throughput over a recent time period, the database server 104 may display other data of the port status 320 for a comparison over a recent period of time. For example, the input errors 324 may be the number of cyclical redundancy check errors, framing errors, and aborts over an extended period of time. Before the data retriever 106 polls the input errors 324, the user may specify that the data displayed may be the number of cyclical redundancy check errors, framing errors, and aborts over a specified period of time, or the number of cyclical redundancy check errors, framing errors, and aborts since the last poll. Repeated polling of the input errors 324 may reveal an increasing number of input errors 324 that have not yet reached the threshold level required for a network event. Such an input problem may not be otherwise detected until a later time.

In box 606, the database server 104 displays the port data 314 for the router on the user interface 102. For example, the database server 104 displays all of the port data 314 for the router that includes the port with the increasing number of input errors 324 along with the network data 204 and the customer data 206 for the router. Executing box 606 may enable a user to evaluate the increase in the input errors 324 for the "Acme Homes" port in the wider context of the router that includes the port. This wider context may enable the user to differentiate between problems isolated to a card in a router and problems for the router.

Turning now to FIG. 7, an illustrative maintenance method for an integrated network and customer database is depicted according to some embodiments of the present disclosure. The maintenance method enables a user to determine an impact of proposed maintenance in advance and to take appropriate action based on the determined impact.

In box 702, the database server 104 determines a customer-specific impact of a proposed action on at least one router. For example, the manufacturer of a frame relay router notifies the user of the database server 104 of a firmware update for a specific card on the frame relay router that operates in a network maintained by the user. The user may input the specified card identification through the user interface 102, and the database server 104 may respond by displaying the port data 314 for each router for which the product data 310 matches the specified card identification input by the user. By referencing the integrated database 208, the database server 104 may display the port data 314 for each customer linked to the specified card, which may be the first card 210.

The user may determine that the first customer computer 114 and the second customer computer 116 for the first customer 222 are linked to the first card 210. Depending on the installation requirements, the impact of the proposed action on the router may be the lack of network access for the first customer 222 during the maintenance time while the firmware update is installed for the first card 210. Alternatively, the impact of the proposed action on the router may be reduced access for the first customer 222 during the maintenance time. The database server 104 may determine the impact of the proposed action for each customer. Based on the determined impact for the proposed action, the user may prioritize by scheduling the proposed action immediately, by scheduling the proposed action at a time when other maintenance is already scheduled, or by postponing the proposed action indefinitely.

In box 704, the database server 104 may reassign a customer port to reduce impact. For example, the determined impact of the proposed action may be the lack of network access for the first customer 222 through the first card 210 on the first router 110, but the database server 104 may indicate that the second card 212 on the first router 110 has an unused port, the third port 218. The database server 104 may reassign the second customer computer 116 for the first customer 222 from the second port 216 on the first card 210 to the third port 218 on the second card 212. The database server 104 either directly reassigns the second customer computer 116 from the second port 216 to the third port 218 or requests a technician to unplug the link for the second customer computer 116 from the second port 216 and to plug the link for the second customer computer 116 to the third port 218. This reassignment may result in providing network access to the first customer 222 through the second card 212 while the firmware update is being installed on the first card 210.

In box 706, the database server 104 may inform a customer of the impact. For example, the database server 104 may respond to a user selection input through the user interface 102 by sending a communication to the first customer 222 specifying the period of time for the proposed maintenance, the impact for the first customer 222, and suggested actions the first customer 222 may take to mitigate any problems following the proposed action.

Turning now to FIG. 8, an illustrative database server 104 for an integrated network and customer database is depicted. The database server 104 may comprise a display interface 802, a peripheral interface 804, a processor 806, a modem or other suitable network interface 808, a memory 810, an information storage device 812, and a bus 814. The database server 104 may be a bus-based computer, with the bus 814 interconnecting the other elements and carrying communications between them. The display interface 802 may take the form of a video card or other suitable display interface that accepts information from the bus 814 and transforms it into a form suitable for a display 816, such as a display for the user interface 102. Conversely, the peripheral interface 804 may accept signals from a keyboard 820, such as a keyboard for the user interface 102, and other input devices such as a pointing device 818, and transform them into a form suitable for communication on the bus 814. Such forms suitable for communication may include tables for a development and maintenance synergy tracker.

The processor 806 gathers information from other system elements, including input data from the peripheral interface 804, and program instructions and other data from the memory 810, the information storage device 812, or from a remote location via the network interface 808. The processor 806 carries out the program instructions and processes the data accordingly. The program instructions may further configure the processor 806 to send data to other system elements, comprising information for the user which may be communicated via the display interface 802 and the display 816, information such as data from an integrated network and customer database.

The network interface 808 enables the processor 806 to communicate with remote systems via a network. The memory 810 may serve as a low-latency temporary store of information for the processor 806, and the information storage device 812 may serve as a long term (but higher latency) store of information, including information such as data for an integrated network and customer database.

The processor 806, and hence the database server 104 as a whole, operates in accordance with one or more programs stored on the information storage device 812. The processor 806 may copy portions of the programs into the memory 810 for faster access, and may switch between programs or carry out additional programs in response to user actuation of the input device. The additional programs may be retrieved from the information storage device 812 or may be retrieved from remote locations via the network interface 808. One or more of these programs configures the database server 104 to carry out at least one of the integrated network and customer database methods disclosed herein.

The database server 104 is shown as a server, although any electronic device having some amount of computing power coupled to a user interface may be configured to carry out the methods disclosed herein. Among other things, personal computers, portable computers, personal digital assistants (PDAs) and mobile phones may be configured to carry out aspects of the disclosed integrated network and customer database methods.

The display 816 for the user interface 102 is shown in FIG. 1 as a video monitor, but may take many alternative forms such as a printer, a speaker, or other means for communicating information to a user, information such as tables for a development and maintenance synergy tracker. The input device for the user interface 102 is shown in FIG. 1 as the keyboard 820, but may similarly take many alternative forms such as a button, a mouse, a keypad, a dial, a motion sensor, a camera, a microphone or other means for receiving information from a user, information such as selections to view an integrated network and customer database.

While several embodiments have been provided in the present disclosure, it should be understood that the disclosed systems and methods may be embodied in many other specific forms without departing from the spirit or scope of the present disclosure.

The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A computer implemented method, comprising:
   parsing router configurations of a plurality of routers to create a set of port data including port data for each port on the plurality of routers, wherein the port data for each port on the plurality of routers includes a corresponding customer name;
   integrating the set of port data and a customer database, wherein the customer database comprises a customer names list that includes, for each specific customer, a list of customer names used by the specific customer, wherein the integrating comprises, for each specific customer, using the customer names list to integrate the port data that includes a corresponding customer name included in the list of customer names used by the specific customer with customer data of the specific customer in the customer database, and wherein the integrating creates an integrated database separate from the plurality of routers; and determining a customer-specific impact of a proposed action on at least one of the plurality of routers based on the integrated database and the proposed action.

2. The method of claim 1 further comprising informing impacted customers of the impact.

3. The method of claim 1 further comprising reassigning a customer port on one of the plurality of routers to another port on one of the plurality of routers to reduce the impact.

4. The method of claim 1 further comprising aggregating port data of the set of port data for each site.

5. The method of claim 1 further comprising compiling port data of the set of port data for each product.

6. The method of claim 1 wherein at least some of the plurality of routers are on different networks.

7. The method of claim 1 further comprising displaying at least one port data of the set of port data on a user interface.

8. The method of claim 1 further comprising retrieving the router configurations from offline backup data stores for the plurality of routers.

9. The method of claim 1 wherein the integrated database further comprises customer bandwidth information for each of the plurality of ports.

10. A system having an integrated network and customer database, comprising:
- a data retriever that retrieves router configurations of a plurality of routers, wherein the data retriever retrieves the router configurations from backup data stores for the plurality of routers;
- a database manager stored on a non-transitory computer readable storage medium that when executed by a processor parses the router configurations to create a set of port data including port data for each port on the plurality of routers, wherein the port data for each port on the plurality of routers includes a corresponding customer name,
- wherein the database manager when executed by a processor further integrates the set of port data and a customer database, wherein the customer database comprises a customer names list that includes, for each specific customer, a list of customer names used by the specific customer, and wherein the integration includes, for each specific customer, use of the customer names list by the database manager to integrate the port data that includes a corresponding customer name included in the list of customer names used by the specific customer with customer data of the specific customer in the customer database the integration creates an integrated database; and
- wherein the data retriever responds to user input by polling at least one of the plurality of routers to display a port status with corresponding port data and customer data from the integrated database on a user interface.

11. The system of claim 10 further comprising aggregating port data of the set of port data for each site.

12. The system of claim 10 further comprising compiling port data of the set of port data for each product.

13. The system of claim 10 wherein the integrated database further comprises customer bandwidth information for each of the plurality of ports.

14. A computer implemented method, comprising:
- parsing router configurations of a plurality of routers to create a set of port data including port data for each port on the plurality of routers, wherein the port data for each port on the plurality of routers includes a corresponding customer name;
- integrating the set of port data and a customer database, wherein the customer database comprises a customer names list that includes, for each specific customer, a list of customer names used by the specific customer, wherein the integrating comprises, for each specific customer, using the customer names list to integrate the port data that includes a corresponding customer name included in the list of customer names used by the specific customer with customer data of the specific customer in the customer database, and wherein integrating creates an integrated database separate from the plurality of routers;
- receiving a network event;
- processing the network event with the integrated database; and
- displaying on a user interface a port status of at least one port of the plurality of routers, wherein the port status includes corresponding port data and corresponding customer data from the integrated database.

15. The method of claim 14 further comprising aggregating-port data of the set of port data for each site.

16. The method of claim 14 further comprising compiling port data of the set of port data for each product.

17. The method of claim 14 further comprising displaying at least one port data of the set of port data on the user interface.

18. The method of claim 14 further comprising retrieving the router configurations from offline backup data store for the plurality of routers.

19. The computer implemented method of claim 1 further comprising: receiving a selection of a specific customer from a user interface; responsive to receiving, retrieving from the integrated database port data from the plurality of routers that are related to the selected specific customer.

20. The computer implemented method of claim 19 wherein at least some of the plurality of routers are on different networks, and wherein the port data retrieved from the integrated database further includes both a number of ports linked to the selected specific customer and bandwidths for the ports linked to the selected specific customer for each network accessed by the selected specific customer.

21. The computer implemented method of claim 1 wherein each port is assigned to only one customer.

* * * * *